Aug. 23, 1949.    L. C. KARRICK    2,479,576
APPARATUS FOR MAKING BUILDING MATERIAL
Filed March 2, 1942    3 Sheets-Sheet 1
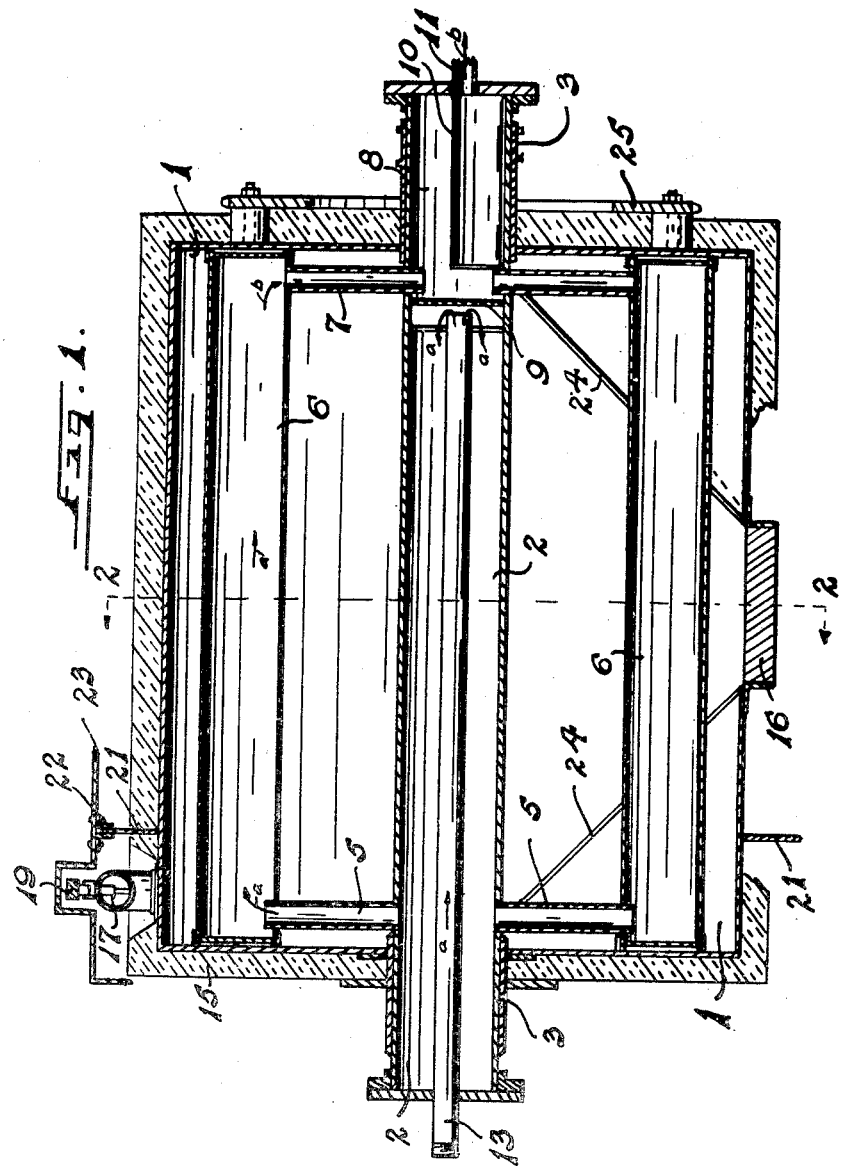

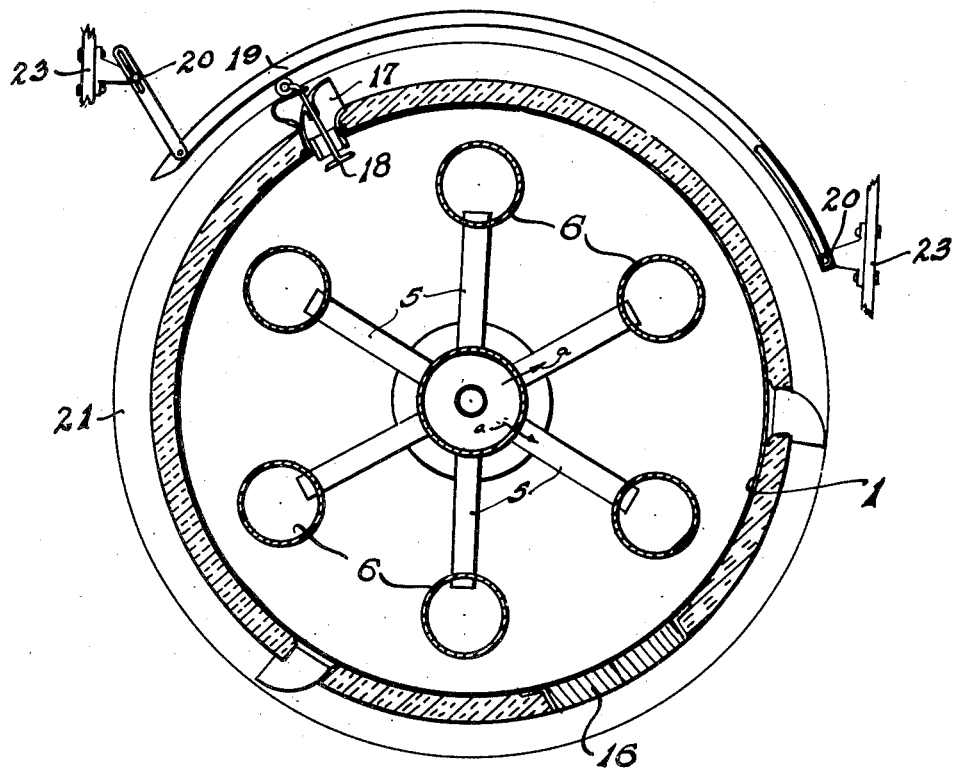

Aug. 23, 1949.  L. C. KARRICK  2,479,576
APPARATUS FOR MAKING BUILDING MATERIAL
Filed March 2, 1942  3 Sheets-Sheet 3
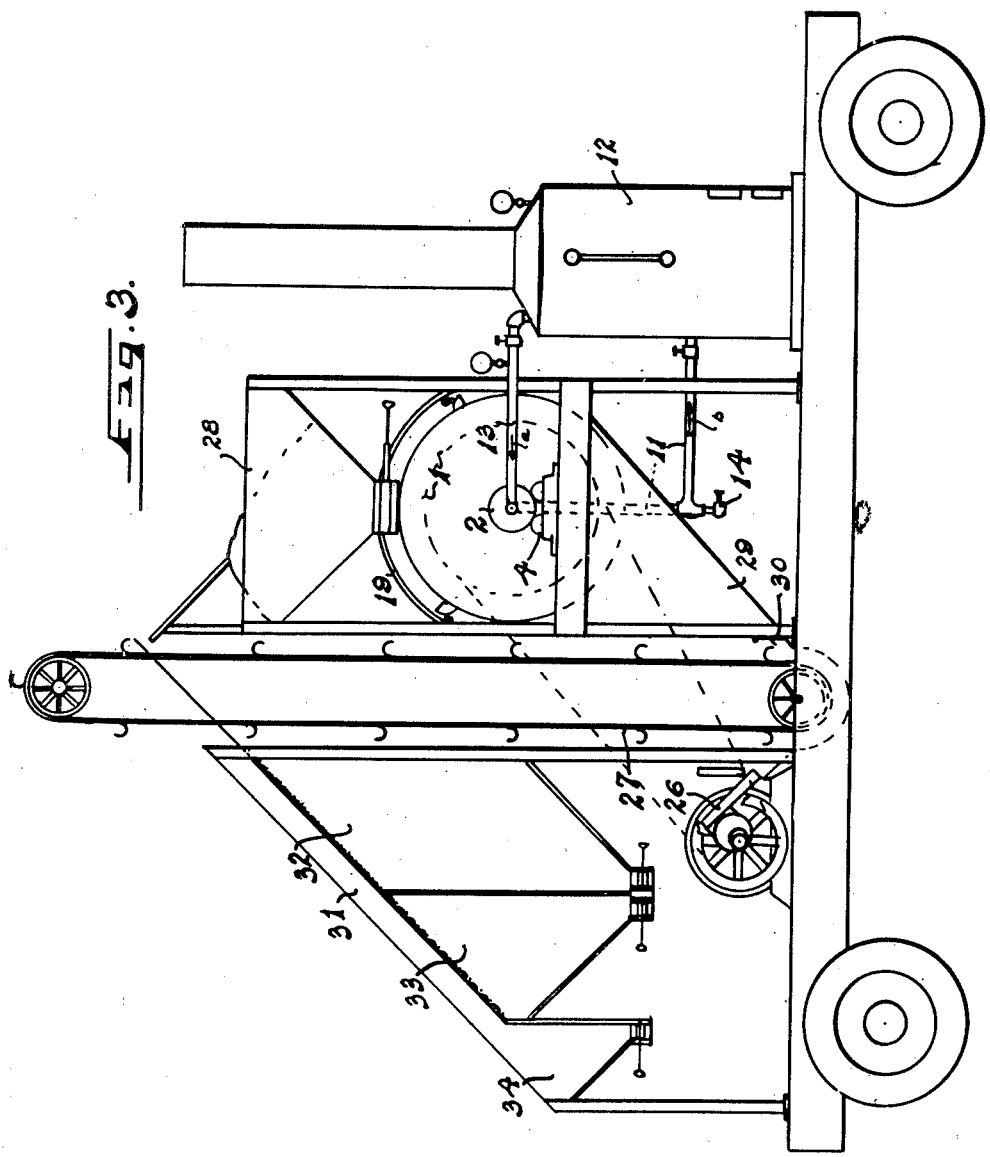

Patented Aug. 23, 1949

2,479,576

UNITED STATES PATENT OFFICE 2,479,576

APPARATUS FOR MAKING BUILDING MATERIAL

Lewis C. Karrick, Salt Lake City, Utah

Application March 2, 1942, Serial No. 433,064

7 Claims. (Cl. 263—53)

This invention relates to building material and methods of making same, and more particularly to a portable apparatus for making a non-conducting building material of calcined gypsum and methods of making same.

Heretofore it has been the practice in some instances to prepare gypsum by finely pulverizing and subjecting it to heat while agitating it. Pulverizing has been employed primarily in order that the mass will become aerated and easily stirred in the mixing which accompanies calcination in the well-known kettle processes. Fine pulverizing requires burdensome expense for machinery and power, and I have found that great economy is effected by eliminating pulverizing and, instead, merely breaking the rock gypsum down to granular sizes.

Long investigation has brought out the fact that the final cost of gypsum products is largely made up of the freight cost of the gypsum to the factories and of the higher freight cost on the finished products. In my invention I provide a simple and useful portable plant which can be moved to any new building site and convert run-of-mine gypsum into the finished products on the job, the rock gypsum having been delivered to the site at much less cost than is possible by the present practice of shipping in the same tonnage of manufactured gypsum products. Rock gypsum is well distributed in deposits throughout the United States and, therefore, is easily and cheaply obtained. This new low-cost heat and sound-insulating wall material can now be supplied for all building construction and in the present emergency can be used for war structures and for low-cost defense workers' homes, it being both attractive and easily formed into very comfortable dwellings.

It is therefore an object of this invention to provide a device for making building material which will be efficient, quick, and economical in the calcination operations.

It is old to calcine gypsum by subjecting it to open flame in rotary kilns, but experience has established that such practice produces a yield of varying quality, besides frequently resulting in overheating or underheating the gypsum. Furthermore the product is soiled by the products of combustion in the old kiln practice, unless low-cost gas heat is available. In United States Patents Nos. 1,897,259 and 1,967,029, issued to William Leon Ellerbeck and me, is disclosed an internally-heated drum wherein the gypsum is calcined by tumbling it over tubes heated by electric resistors, and in which apparatus the sudden release of steam from the rock explodes the gypsum crystals. Recent experiments have established that better calcination is obtained if the heating is accurately controlled as to temperatures, and this is done in the present instance by heating the gypsum in an insulated tumbler drum or chamber having internally-disposed tubes with high pressure steam so that every point in the calciner receives its heat from the latent heat of condensing steam and, therefore, is exactly at the same temperature throughout.

It is another object of the present invention to provide for the calcination of gypsum material rapidly, conveniently, and under conditions which enable absolute control of the quality of the products.

It is another object of the invention to provide a method of calcination whereby the gypsum is subjected simultaneously to stirring by tumbling, and end-to-end circulation while continuously contacting controlled heating members which prevent accidental overheating or underheating of the gypsum.

It has been observed, heretofore, that in the preparation of plasters of gypsum products and water, only a small portion of the added water unites with the gypsum product in the setting, the larger portion of the water merely acting as a "lubricant" and finally evaporates from the set plaster and leaves voids or pores throughout the body thereof. However, the plaster made from my calcined granulated gypsum is a cellular product due to the spaces between the lumps but the cell walls are very dense and have no porosity whatsoever, and, therefore, is a very hard and non-absorptive element. It is known that ordinary plaster when dry is very absorptive to water, and unless it is water-proofed, is not desirable for exterior of buildings. By sizing the granules in my product or by using certain proportions of various sizes, it is feasible to control the gross density and strength of the final product.

In addition, it has been discovered that by pressing and/or immediately agitating the mix after adding the water, the density of the final product will be substantially increased. If desired, the granular body such as cast blocks may be made with large voids, as by pouring off the surplus water. Also, the cost of the product may be reduced by mixing in certain proportions of raw, clean gypsum granules.

It is, therefore, a further object of the invention to provide a plaster body which will be durable, strong, and economical to manufacture, and a method of making same whereby the physical properties of the final body may be easily controlled.

Among the additional objects of the invention are the production of a building body of high strength and low heat- and sound-conductivity and with good acoustic properties, requiring a small amount of labor in its preparation and application on the job, as well as a body easily manufactured from several different types of gypsum.

These objects I accomplish with the device illustrated in the accompanying drawings in which similar numerals and letters of reference indicate like parts throughout the several views and as described in the specification and pointed out in the appended claims.

In the drawings Figure 1 is a longitudinal diametrical section of the main rotary tumbler or calcining chamber.

Figure 2 is a section on line 2—2 of Figure 1.

Figure 3 is a diagrammatic side elevation of the entire portable assembly showing the relationship between the rotary chamber and the boiler, crusher, elevator and charging bin, the discharge bin, elevator and several screens for final products, the power engine not shown, and the trailer support on which the plant is moved to building sites.

This application is a continuation-in-part of my copending application for patent, Serial No. 176,279, filed on November 24, 1937, for Building material and method of making same, now Patent No. 2,274,705, dated March 3, 1942.

A substantial view of the prior art for calcining gypsum may be obtained by reference to the patents enumerated above. In the practice of the present invention, the rock gypsum is crushed to a granulated, as distinguished from powdered, size. This operation incidentally will result in the powdering of some of the gypsum, but the powdered portion is utilized in accordance with this invention.

The crushed product is then subjected to calcination in a tumbler or revolving drum which has internally disposed heating tubes through which is circulated high pressure steam. It has been found that by covering the rotary drum with several inches of insulating material, the granular gypsum is efficiently and accurately heated by contact with the heating tubes. The precise temperatures and other conditions employed in the treatments may vary somewhat is relation to the properties of the particular material being calcined. However, I have found that the invention may be successfully applied with standard high-grade gypsum as follows:

The steam may be heated to 67 pounds absolute (300° F.) in the boiler and delivered into the heating tubes without drop in pressure, and this saturated steam temperature has been found to be high enough to calcine gypsums to the "first settle" stage. I prefer, however, to use steam of at least 75 pounds pressure (308° F.) in order to obtain more rapid heating and thereby speed up the process. I have used 85 pounds pressure in many plant runs with excellent results and the calcination is completed at a rapid rate. If it is desired to calcine to the "second settle" stage, it is found that a saturated steam pressure of 145 pounds per square inch (355° F.) is adequate, although the calcination may be speeded up if the steam is at higher pressure, likewise if the lumps are to be calcined only partway through.

In producing "first settle" plaster, it is desirable to keep the steam temperature close to the final temperature desired for the calcination of the plaster product in order to avoid some of the gypsum becoming calcined beyond the half-hydrate stage with the well-known adverse effect on water adsorption, strength, heat of setting, as well as other properties of the product. However, if a "second settle" product is desired, steam temperature may be considerably above that corresponding to the temperature at which this product begins to form, since I have found that the plaster qualities as regards hardness do not change much if the temperature corresponding to "second settle" is exceeded, that is, until the temperature passes 400° F. Consequently, in producing "second settle" plaster, I often use saturated steam within the heating tubes at 200 pounds pressure, absolute, which corresponds to 382° F.

In the above operation, the heating by high pressure steam has not only been found to admit of precise control of the temperature and of the final product, but it is also economical. For example, distilled water is actually used in the steam system. Obviously the heat delivered to the gypsum is the latent heat of condensation of the steam within the tubes, the water thus formed by the condensing steam being continuously returned to the boiler wherein it is re-vaporized as fresh steam for further work of calcination. By thus continuously re-using the distilled water, it is necessary at rare intervals to add fresh water to the system, and then only in amounts to compensate for losses due to leakages from pipe joints and connections.

In the calcining phase, therefore, no fire is brought into contact with any part of the calcining equipment; in fact, the furnace and boiler may be located at a remote part of the plant or may be out of doors. It will be observed that every point in the rotary calciner is at exactly the same temperature so that no over-heating of the gypsum is possible. Thus the process avoids the uncertainties characterizing the kettle type calciners.

In order to understand the third or plaster-forming phase of my invention, it will be necessary to bear in mind that whereas most commercial gypsum plasters require between 55 and 65 grams of water to 100 grams of plaster in order to produce the state of plasticity described by the American Society for Testing Materials as "testing consistency" (this being a consistency approximately the same as that used in plastering walls), the plaster in setting takes into chemical union only approximately 15 percent of its weight of water. The balance of the original 60, more or less, parts of water, that is from 40 to 50 grams, finally evaporates from the mass, thereby forming pores or voids in the product in addition to those formed from air bubbles. Because these voids ordinarily are evenly distributed through the mass, the resulting product has many thin celled walls, causing the product to lack the desirable strength. While in my invention and new composition I do not avoid all air pockets, I do, however, form a cellular product which is entirely lacking in air pockets within the cell walls. It is also practicable, in the practice of my invention, to vary the size of the cells and the thickness of the walls to any dimension desired, by proper sizing of the gypsum granules and/or by pressure on the wetted material after it is placed in the wall or block forms. The following operations have been employed satisfactorily in the production of the improved building material:

Granular calcined product obtained by the steps described above is screened as it comes from the calciner so as to remove all of the finer material, such as that below 8 or 16 mesh screen size. This fine material thus removed has been found to mix into a very smooth grain-free mass which I use for wall covering or casting plaster. The dust-free granular calcined gypsum is then used to form the composition. The new composition is obtained by placing the dry material into moulds, such as brick, block, or wall forms. Then water is applied by pouring it over the mass so as to thoroughly wet the mass of granules. The wetted mass will be found to settle together as the contacting points of the granules become wet. In a few moments the mass sets, by which time the lumps or granules have absorbed water throughout. Prior to setting the mass should be pressed if it is desired to increase the density of the mass. When setting has progressed about thirty or forty minutes the blocks can be removed from the forms or the wall forms may be removed, or raised and another layer of the material placed in the wall forms. The material quickly reaches a safe load-bearing strength.

The primary advantage of the new product is its insulating property and hardness. The wetted granules take up only fifteen percent of their weight in setting, as compared with the 50 to 60 percent of water needed in the mass of pulverized plasters which leaves the latter product relatively soft. My product is, therefore, composed of lumps or granules solidly joined together and of substantially the hardness of rock gypsum. The granules are cemented together at their points of contact by the rehydrated gypsum, and the density and hardness of the bonds being greatest where the contact is best and where the pressure is greatest, that is between the granules where the water is largely squeezed out of the plaster-water contacts. For best rigidity, therefore, the mass should be agitated or pressed slightly only, unless a dense mass is desired in which case greater pressure is used. Obviously this cementing zone is less dense as the distance increases from the center of the contacting area of the adjacent granules. The cementing film tends to eliminate angularity of contact between the granules so that the voids in the final mass become rounded.

From the foregoing it will be observed that the method is quite rapid, and it requires no mixer or mixing box on the construction job; furthermore, there is no need for installing pulverizing equipment in the plant nor power for running same.

The invention is applicable to the production of building material to suit various specific requirements. For example, the size of the granules may be varied to control the size of the voids between granules and, therefore, the gross density of the final product. I have found that slight agitation of the mass immediately after adding the water causes settling, and this will greatly increase the density of the mass besides increasing the heat and sound conductivity and hardness of the product. Conversely, the heat and sound insulating properties may thereby be pre-determined with convenience and reliability. It will be understood, therefore, that the density or percentage of voids in the mass can be easily controlled for any particular job or product merely by agitating the mass, also by applying pressure after the water is added. A wall may be varied in density at different points to advantage, for instance next to door frames where the jar of slamming doors might cause the wall to crack, or over windows and door and to form window ledges, and in buildings where the walls are required to support heavy loads and in present practice pilasters are used. In the latter instance I merely press the material into a more dense element where the pilaster would be required and thus obviate the need for irregularity in wall thickness caused where pilasters are used with other materials.

The nature of the product may also be controlled by utilizing for the mix carefully sized masses of granules; and in some instances this may be still further employed with a desirable effect on the product by immediately pouring off the surplus water which has not been absorbed by the granules. This operation increases the size of the voids in the final product and yet leaves a solid bond or contact between the granules. And furthermore, in order to reduce the cost of the finished material, it is feasible to substitute granules of cleansed raw gypsum for some of the calcined granules. Upon setting, such material developed a strong bond between the rough surfaces of the raw gypsum and the rehydrated plaster. In the latter instance, the technique may be further changed so as to have proportions of both raw and calcined gypsum, and in various screen sizes. This operation may be controlled to produce a dense aggregate so that when wetted it may be pressed into a very hard flooring or block. When this element is set, dried thoroughly, sanded down, and varnished, a very beautiful surface is obtained. The wear-resisting properties are not as good as a Portland cement floor but it will be satisfactory for residences, with or without rugs. Also a more extended use will be found in floors on which linoleum, rubber compositions and other shock-absorbing coverings are cemented. The method has been applied and a very fine product has resulted with granules up to one inch in diameter, both with and without raw granules embedded therein.

In the drawings, 1 is the rotary tumbler, 2 the hollow shaft on which are mounted wear-resisting tires 3, and 4 denotes roller bearings which support and rotate the tumbler. 5 are steam-distributing pipes connecting hollow shaft 2 with heating tubes 6. 7 are connecting pipes like 5 through which the condensed steam from heaters 6 returns into compartment 8 at the end of shaft 2. The compartment 8 contains within it the steam-tight partition 9, and dipper 10 which elevates the water during rotation of the tumbler and causes it to run out of the compartment through pipe 11 and into the steam boiler 12. High-pressure steam comes from boiler 12 through pipe 13 and enters the tumbler shaft 2 by way of pipe 13, and flexible coupling not shown, and is delivered into a remote end of the shaft near partition 9. The flow direction of the steam is shown by arrows a, and the flow of the water formed from condensed steam by arrows b, and it will be noted that the steam flows continuously through the shaft and heating tubes, condensing enroute, and is drawn off as liquid at 11. In starting to operate the unit the steam is passed through and out of the system by valve 14, thereby removing all air from the system. Around the tumbler 1 is a layer of insulating material 15. A door 16 is provided to the tumbler which may be of the folding type or any other type that may be clamped into place. A valve 17, comprising a poppet valve 18 and actuated by a peripheral cam 19 is provided for exhausting the steam released from the gypsum undergoing calcination. The cam linkages 20 provide means for setting the period of release of the steam during each rotation of the tumbler and duration of release time. Thus by controlled release of the steam evolved from the gypsum a high pressure may be built up within the tumbler and when suddenly released has been found to explode the gypsum crystals. This feature of the process may account in large degree for the fact that the process has given wall plasters from several commercially used gypsums which is substantially fifty percent higher in sand-carrying capacity than the plaster produced from said gypsums by present plants. A fin 21 is provided which extends around the tumbler, and fits into a sliding groove 22 in the chamber 23 that houses the tumbler 1, thus preventing the dust from valve 17 from getting into the chamber which surrounds the balance of the tumbler. Inside the tumbler 1 are baffles 24 which cause an end-to-center mixing of the gypsum during rotation of the tumbler, and also serve to direct all of the charge of gypsum products out of the tumbler when the door 16 is opened. On the end of the tumbler is fastened the drive gear 25 which, as illustrated, is a sprocket wheel and is powered through a chain and small sprocket wheel not shown.

In Figure 3 is shown a preferred form of my portable plant embodying all of the aforementioned features of my invention, and in addition a crusher 26 which receives run-of-mine gypsum and reduces it to gravel or granules, including some dust-size product. The crusher delivers into the elevator 27 and thence into hopper 28 which preferably holds substantially one tumbler-charge of gypsum granules.

Also Figure 3 shows a hot chamber 29 into which the calcined product drops from tumbler 1. From this chamber the product is withdrawn by chute 30 into elevator 27 and thence is delivered by deflector, not shown, onto selective screens 31 and into finished product bins 32, 33 and 34. These bins indicate a separation of the product into a dust-size product and two dust-free sizes of granules suited to making the above-described heat and sound-insulating products, flooring material, etc.

It is obvious that various changes and modifications may be made in the details of steps and quantites of the above specifically described embodiments of this invention without departing from the spirit thereof, and the method, apparatus and products of the invention include all such changes, modifications, substitutions, and equivalents as come within the scope of the following appended claims.

What I claim is:

1. A calcining device of the class described comprising a rotary tumbler mounted for rotation on a hollow shaft; a central steam pipe mounted through one end of and concentric with the hollow shaft and adapted for connection to a source of steam; a dividing partition in said hollow shaft; radial connecting pipes extending outwardly from adjacent one end of said shaft; longitudinal heating pipes in said tumbler connected to said radial pipes; return flow radial pipes connected to said shaft adjacent the opposite end and on the opposite side of the partition from the first-named radial pipes; condensate removal means communicating with said hollow shaft for withdrawing condensate from the tumbler; means for introducing material to be calcined into said tumbler; valve means adapted to periodically open and discharge from the tumbler area steam generated therein; and means for removing calcined material from said tumbler.

2. A device as defined in claim 1, including baffle means disposed in said tumbler to cause the material to be thoroughly agitated while undergoing calcination.

3. A calcining device of the class described, comprising a tumbler mounted for rotation; means for rotating said tumbler; a plurality of heating pipes in said tumbler; means for introducing steam under pressure into said heating pipes; means for withdrawing condensate from said pipes; and means for withdrawing calcined material from said tumbler.

4. A calcining device of the class described comprising a tumbler mounted for rotation; means for rotating said tumbler; means comprising a plurality of pipes for introducing steam under pressure into said tumbler to heat said tumbler; and means comprising a plurality of valves spaced about said tumbler, springs for holding said valves closed at times, and mechanism for intermittently opening said valves against the action of said springs for intermittently releasing the pressure of steam which is generated within said tumbler during the calcining process.

5. A calcining device of the class described comprising a tumbler mounted for rotation; means for rotating said tumbler; a plurality of heating pipes in said tumbler; means for introducing steam under pressure into said heating pipes; means for withdrawing condensate from said pipes; and means for intermittently releasing the pressure of steam which is generated in said tumbler during the calcining process.

6. A calcining device of the class described comprising a tumbler mounted for rotation; means for rotating said tumbler; means comprising a plurality of pipes for introducing steam under pressure into said tumbler to heat said tumbler; and means comprising a plurality of valves spaced about said tumbler, springs for holding said valves closed at times, and mechanism for intermittently opening said valves against the action of said springs for intermittently releasing the pressure of steam which is generated within said tumbler during the calcining process; and a portably mounted support for said tumbler, said rotating means, said steam introducing means, said pressure varying means, and said pressure releasing means.

7. A calcining device of the class described comprising a portably mounted platform; a tumbler mounted on said platform for rotation thereon; means mounted on said platform for rotating said tumbler; a plurality of heating pipes in said tumbler; means for introducing steam under pressure into said heating pipes; means for withdrawing condensate from said pipes; and means for intermittently releasing the pressure of steam which is generated in said tumbler during the calcining process.

LEWIS C. KARRICK.

(References on following page)

REFERENCES CITED

The following references are of record in the file of this patent:

UNITED STATES PATENTS

| Number | Name | Date |
|---|---|---|
| 833,918 | Carpenter | Oct. 23, 1906 |
| 985,778 | Caille | Mar. 7, 1911 |
| 1,086,629 | Valerius | Feb. 10, 1914 |
| 1,715,729 | Washington | June 4, 1929 |
| 1,740,192 | McNeil | Dec. 17, 1929 |
| 1,798,857 | Tyler | Mar. 31, 1931 |
| 1,897,259 | Karrick | Feb. 14, 1933 |
| 1,914,877 | Wright | June 20, 1933 |
| 1,967,029 | Karrick | July 17, 1934 |
| 1,979,704 | Randel | Nov. 6, 1934 |
| 2,204,777 | Smith | June 18, 1940 |

FOREIGN PATENTS

| Number | Country | Date |
|---|---|---|
| 344,478 | Germany | Nov. 24, 1921 |